Patented Nov. 13, 1951

2,574,895

UNITED STATES PATENT OFFICE 2,574,895

PROCESS OF ACID-TREATING CLAY

Glenroy Stecker, Morton Grove, Ill., assignor to Great Lakes Carbon Corporation, Morton Grove, Ill., a corporation of Delaware No Drawing. Application January 27, 1947, Serial No. 724,719

3 Claims. (Cl. 252—450)

This invention relates to a process for manufacturing catalysts from minerals having a planar or micaceous atomic structure. More particularly it relates to the manufacture of catalytic agents of high activity and stability by treating siliceous minerals of the alumino-silicate and/or magnesia-silicate type, including the bentonitic clays, with an acid to dissolve a portion of the alumina and/or magnesia therefrom followed by reprecipitation of the alumina or magnesia thus extracted, upon the material.

The acid treating of clays to activate them is practiced commercially. It is known that clays, particularly montmorillonite, can be leached with mineral acids to enhance the catalytic activity thereof. Frequently such clays contain base-exchangeable metal cations including magnesium, calcium, iron, sodium, lithium, and potassium. The clays also contain other components which are not base-exchangeable; these include aluminum and/or magnesium and sometimes iron. These cations and other components are removed, at least in part, during the activation. If the acid treatment is too severe, the activity of the treated material as a catalyst and for some other purposes is reduced and the material is said to be overtreated.

A catalyst made by the usual acid treatment of clays is susceptible after a short period of use, to reduction in catalytic activity, particularly in such processes as catalytic cracking of petroleum oil, reforming of gasoline, and the like conducted at elevated temperatures in the range of about 300–600° C. and requires intermittent regeneration or reactivation, sometimes to temperatures of about 700° C., to burn off carbonaceous deposits formed during the processing step.

I have discovered that improved catalysts can be prepared from certain minerals including clays having a lattice or planar atomic structure, by first leaching the minerals with acid under conditions to dissolve out a part of certain metals contained in the lattice, followed by re-deposition upon the leached material of a part or all of the metal dissolved, as a hydrous oxide comprising mainly alumina and/or magnesia from the leaching solution.

I have further found that the catalysts can be improved to an even greater extent by conducting the re-deposition in the presence of a suitable material having reducing properties and/or the ability to keep iron compounds in solution under the conditions at which the alumina and/or magnesia is precipitated.

I have found that catalysts thus made not only have a high degree of initial catalytic activity but they are stable upon continued use and regeneration over long periods of time. They are particularly stable in the presence of sulfur compounds in organic materials undergoing reaction therewith and which exert a harmful effect on the usual acid treated natural clays, causing a rapid decrease in catalytic activity. The catalysts of this invention are readily prepared and the extent of acid pretreatment of the raw clay mineral can be carried out over a much wider range than is the case when the clay is subjected only to an acid treatment followed by water washing and then used as a catalyst. For many purposes the extent of the initial acid treating followed by the deposition of hydrated oxide removed during the acid treating step permits the production of catalysts which are particularly desirable for certain reactions, which means that the catalyst composition and activity can be controlled to suit the particular purpose at hand.

In a broad embodiment the invention, comprises extracting a portion of the lattice metal atoms from a siliceous mineral having a planar structure, with a mineral acid and thereafter depositing as hydrated oxides the aluminum and/or magnesium thus extracted.

In another broad embodiment, the invention comprises extracting a portion of the lattice metal atoms from a siliceous mineral having a planar structure, with a mineral acid such as hydrochloric, sulfuric, or nitric acid at a temperature above about 80° C. to dissolve from the mineral up to about 90% of the aluminum and/or magnesium present therein, adding a reducing agent to the solution containing the dissolved metals, and thereafter precipitating that part of the metals comprising aluminum and/or magnesium, as hydrous oxides by adding a volatile basic precipitant, washing the material, and finally calcining it at a temperature above about 300° C.

Those minerals which may be treated according to this invention comprise silicates of aluminum and/or magnesium with or without other metals such as iron being present, and have a planar or sheet-like structure as shown by the X-ray diffraction pattern. Such structure is described and illustrated in the book "Atomic Structure of Minerals" by W. L. Bragg published in 1937 by the Cornell University Press of Ithaca, New York, on page 206.

Those minerals termed clays which may be treated according to this invention comprise naturally occurring materials generally with plastic properties, having an essential composition of particles of very fine size grades; and an essential composition of crystalline fragments of minerals that are essentially hydrous aluminum and/or hydrous magnesium silicates; said materials having a plate-like or planar structure.

The basic unit of such minerals and clays consists of a lattice comprised of several layers or sheets. One layer comprises alumina and/or magnesia (in some instances iron may be present therewith) and consists of two planes of closely packed oxygen atoms and hydroxyl groups between which the aluminum and/or magnesium atoms are embedded in such a manner that each is regularly oriented with a group of six oxygen atoms and hydroxyl groups, the oxygen atoms of each plane thereof form a part of silica layers now to be described. The silica layer or sheet consists of tetrahedral silica groups. Each silicon atom has four oxygens attached to it to form a regular tetrahedron with silicon at its center and with three of the oxygens in a plane forming the base of the tetrahedron; the fourth oxygen atom being accounted for as above described. The silica layer consists of silicon atoms all lying in one plane and attached to oxygen as described and which lie in adjacent planes; further, the silicon atoms occupy the corner positions of a regular hexagonal pattern. Certain of these minerals or clay materials contain two such silica sheets, one above and one below the alumina and/or magnesia sheet. Thus the basic structure of bentonite, montmorillonite, pyrophyllite, etc. comprises two silica sheets with a central sheet between them containing aluminum, magnesium, or aluminum and magnesium. Talc is similar, except that magnesium occupies the central plane without aluminum being present. Thus, for pyrophyllite, the basic unit or lattice comprises two silica layers and an intermediate hydrous alumina layer.

The unit group of the lattice is arbitrarily considered as being made up in the ratio of, four silicon atoms in each silica sheet to four aluminum atoms in the alumina sheet, or in the case of magnesium alone with six atoms thereof, and it is thusly referred to herein.

The planar lattice comprises some multiple of this unit group. The mineral is made up of stacks of these planar lattices, one above the other with spaces between which are occupied by water, and in some cases by base-exchangeable ions. Pyrophyllite has no base-exchangeable ions. Montmorillonite, which contains some magnesium as well as aluminum in the central lattice plane or sheet, has base-exchange properties. Replacement of part of the metal atoms in the central lattice layer by another metal of lower valence, e. g., aluminum by magnesium, or merely removal of part of the metal atoms sets up an ionic charge at the surface of the lattice, that is, in the space between the stacked lattices. The base-exchange properties of the minerals are related to this phenomena.

Among the specific materials that may be treated according to the present invention are bentonite, montmorillonite, pyrophyllite, talc, the hydrous micas, illite, and the kaolin group including kaolinite. Kaolinite is an example of the planar structured minerals which have only one silica layer associated with an alumina layer and is, therefore, not exactly equivalent to those minerals having two silica sheets or layers comprising the lattice.

For purposes of simplification, the space between the lattices is referred to as the "interplanar" space, and the space or planes within a lattice, e. g., the metal layer between the silica layers of a given lattice structure, is referred to as the "intraplanar" layer.

The mineral is ground to a fine state of subdivision, preferably 200 mesh or smaller by known methods and is mixed with mineral acid to form a slurry. The amount and the solution concentration of the acid employed may vary, and acid may be applied in more than one stage.

For example, in certain cases in which the mineral contains base-exchangeable metal cations, or impurities such as calcium, magnesium or iron carbonates, dilute acid may be used to remove these impurities by treating at temperatures in the range of about 10–40° C. This has no effect upon the essential crystalline lattice structure of the material and has no appreciable dissolving action on the intraplanar metals. It does remove interplanar base-exchangeable metal cations as well as certain other impurities. This treatment imparts no substantial catalytic activity to the mineral, although in some instances it will condition the mineral to produce a better activation by a subsequent treatment thereof.

As an alternative, part of the lattice intraplanar metal atoms of the mineral may be removed in an initial acid treatment by using a temperature of from 50° C. to the boiling point, using only enough acid to accomplish the desired pretreatment. When this is done the solution is discarded. In this way some undesirable metal compounds are removed, including much of the calcium and the alkali metal cations, and some iron. In this way also, the amount of aluminum and/or magnesium to be reprecipitated on the treated mineral in a later step can be controlled by the extent of the initial treatment when some extraction of the latter metals is intended thereby, especially where it is desired to redeposit less than the total amount of such metals finally rendered soluble.

The lattice metal which usually comprises aluminum and/or magnesium and may include some other elements such as iron in small percentages, is removed from the lattice structure by treatment with acid of about 5–15% concentration or more at a temperature of from about 80° C. to the boiling point of the mixture. In some cases stronger acid may be used, e. g. 40% or more. This step can be carried out in open vessels or vats or can be carried out in vessels equipped with a reflux condenser or can be carried out in closed vessels which can be placed under steam pressure. The exact type of apparatus and methods used will depend to some extent upon the mineral as well as the desired extent of removal of intraplanar metal atoms. The concentrations of acid may also affect the manner of treatment. Additional increments of acid can be added to the mineral-acid slurry from time to time as acid is consumed during the digestion. The amount used will vary depending upon how much of the intraplanar metal is to be dissolved out of the lattice.

The time for the acid treatment will vary, although 5–10 hours is sufficient for some minerals. Total times of 12–24 hours treatment are useful with the more refractory minerals. The time for individual stages, when two or more are used, varies from about one to six hours each.

As a general proposition, the extent of acid treatment can be divided into two arbitrary classes. On the one hand, the treatment is carried out only up to the maximum removal of components which can be had without appreciably changing the fundamental lattice structure as shown by the X-ray diffraction pattern to be an essential characteristic of the original crystalline mineral. In the case of minerals containing only aluminum in the intraplanar layer such as pyrophyllite, this means that about 30 to about 50% of the aluminum is removed from the lattice structure. In the case of talc, which contains only magnesium in the lattice, about 67% of the magnesium can be removed. It appears essential that at least two intraplanar metal atoms per unit group containing four silicon atoms be left in the lattice or else deep seated changes occur as shown by alterations in the X-ray diffraction pattern.

The other mode of treatment is to carry out the extraction to a point where the crystalline lattice structure has begun to break down. Thus for example, between about 50% and about 90% removal of lattice aluminum (or magnesium), the X-ray diffraction pattern of the residual mineral undergoes a remarked change. Coincidentally therewith, the catalytic activity of the acid treated mineral (before reprecipitating alumina, etc.) also undergoes substantial changes. Certain minerals such as montmorillonite can be treated to remove up to about 50% of the lattice metal and at that point the treated clay has approximately its maximum catalytic activity. Further removal of aluminum results in a decrease in catalytic activity of the acid treated clay.

The characteristics of catalysts produced by this invention using each of these two procedures, may vary. One may be more desirable than the other for specific purposes.

I have found that after the digestion with acid has been carried out to the desired extent, that I can produce catalysts of superior activity and stability by reprecipitating the dissolved aluminum as hydrous oxide onto the treated mineral from the solution of extracted materials. The same is true of reprecipitated magnesia. This precipitation can be carried out by the addition of a volatile base such as ammonium hydroxide or amines and other organic bases. The dissolved metals can be reprecipitated completely or only in part as hydrated oxides. For example, if it is desired to have less metal oxide in the final catalyst than occurred in the original mineral, a portion of the solution can be discarded before precipitation is carried out.

Alternatively, the method of first extracting base-exchangeable metal cations together with a predetermined quantity of aluminum and/or magnesium, etc., from the lattice, may be used. The solution thus produced is discarded. The magnesium tends to be removed more readily than aluminum when both occur together. For example, in a montmorillonite clay, when 20% aluminum is removed, about 30% magnesium and 90% calcium are taken into solution.

The amount of aluminum and the ratio of alumina to magnesia put back from solution in the extractant can be governed by the pH of precipitation. Alumina will precipitate at a lower pH than magnesia, hence this offers a means for control thereof.

While the reprecipitation of the hydrous metal oxides can be done in the heated slurry, the slurry may also be cooled to about room temperature, say to 10° C. to 40° C., before adding the precipitant. In some cases it is desirable to reheat after precipitation, for instance, to improve the filtering characteristics of the product, or to otherwise alter the properties of the catalyst itself.

I have found that an especially marked improvement in catalytic activity and stability is obtained when the precipitation is carried out in the presence of a reducing agent, particularly one which will prevent the precipitation of ferric hydroxide. Whether or not the beneficial effect has any relationship to the presence or absence of iron in the finished catalyst, it appears that those compounds are particularly beneficial which will prevent iron from precipitating.

Among the materials which may be used are those having an oxidation-reduction potential in a reduced state less than, that is, the negative direction from ferric iron. Among these are stannous, titanous, and molybdenous compounds and the like.

Reducing agents such as sulfur dioxide, sodium hyposulphite, and the like may be used but are not exactly equivalent.

Reagents which form nonprecipitating water soluble complexes with iron, such as sodium catechol disulfonate, may be employed.

Organic reducing compounds such as dihydroquinone and other compounds which are generally photographic developers may be employed. These materials are not necessarily equivalent in their effect. For example, certain of the compounds may be of value not only because of the reducing effect that they possess but also because traces of them remain behind in combination with the crystal lattice or otherwise contained in the final catalyst to render some promoting value to the catalyst in its final form even though the compounds themselves are not necessarily useful as catalysts except in the compositions made by the present invention. In any case I do not wish to be bound by an explanation for an effect which has been observed but the exact chemical nature of which has not been determined.

In general, the metallic compounds which are useful should be soluble in a reduced valence state to an extent sufficient to prevent the precipitation of hydrated ferric oxide in those clay minerals treated which contain iron.

Another method of carrying out the invention is to separate the solution of acid containing the metal dissolved in it from the siliceous mineral treated, passing it through a bed of the compound of a metal in a reduced state and having a lower oxidation-reduction potential than ferric iron, said metal compound being capable of being oxidized to a higher valence state, and thereafter mixing the acid treated mineral with the solution thus treated, and finally adding ammonium hydroxide to precipitate as a hydrated oxide the aluminum and/or magnesium contained therein.

According to another embodiment, a zirconium salt may be added to the treating solution containing dissolved mineral components, and zirconium oxide be precipitated along with hydrated aluminum and/or magnesium oxides therefrom. This adds additional stability and activity to the catalytic material produced.

After precipitation of the hydrated oxides, the catalyst is filtered and may be washed to remove remaining soluble salts and is finally dried and calcined at a temperature of about 300° C. and higher depending on use thereof.

According to another alternative I may reduce the iron to ferrous state prior to extracting with acid by means of a suitable reducing agent, e. g., hydrogen at high temperatures; sulfur dioxide; hydrogen sulfide; sodium hydrosulfite; stannous chloride; etc. at or below 100° C. in the presence of water. When this is done, much of the iron may be removed in the initial acid treatment and in some instances the mineral is conditioned for better activation later. The use of a reducing agent in the subsequent stages of extraction and reprecipitation may not be required in some cases.

The following examples are given to illustrate the invention but should not be construed as limiting it to the exact conditions shown.

Example I

Crushed montmorillonite from a deposit in Nevada was mixed with an aqueous solution of sulfuric acid of about 5% concentration in an amount equivalent to about 0.20 pound of the anhydrous acid per pound of volatile matter free clay. After boiling under reflux for one hour, the mixture was filtered and repeatedly washed with water until substantially free of soluble salts. This removed the base-exchangeable metal cations substantially completely, about 20% of the lattice aluminum, 35% of the magnesium and some iron. Some catalytic activity resulted and there was no significant change in the X-ray diffraction pattern from that of the raw clay.

This material was mixed, without drying, with aqueous hydrochloric acid of 10% concentration and in an amount equivalent to 0.25 pound of anhydrous acid per pound of volatile-matter-free material from the first step and refluxed for six hours, and various treatments of the resulting slurry or suspension is described in the following example.

Example II

A portion of the material from Example I, cooled to 25° C. and still in suspension in the liquid extractant, was treated with ammonium hydroxide solution to a pH of 5.0 to reprecipitate aluminum from solution as hydrated alumina. The material was then filtered, washed and dried. It was calcined at 500° C. for one hour and used as a catalyst.

Example III

To another portion of the material from Example I, in suspension in the liquid extractant, was added stannous chloride solution sufficient to cause the ferric iron color of the liquid to disappear, and then ammonium hydroxide was added to precipitate the alumina at pH 5.0. It was then calcined as in Example II to form a finished catalyst.

Example IV

Another portion of the slurry from Example I was treated as described in Example III except that the pH of precipitation was about 6.5 so that magnesia also precipitated.

The catalysts thus produced according to these examples are active for hydrocarbon conversion reactions such as catalytic cracking; catalytic reforming of gasoline to improve octane rating; isomerization of olefin hydrocarbons; dealkylation of paraffinic, aromatic and naphthenic hydrocarbons; polymerization of olefins; alkylation of aromatic and naphthenic hydrocarbons with olefins; hydrogen transfer reactions, etc.

Analysis of the original mineral indicates that the silica sheet is $(Si_{7.25}Al_{0.75}O_{20})$. The intraplanar layer is $(Al_{3.16}Mg_{0.62}Fe_{0.22}(OH)_4)$. The base-exchangeable or interplanar metal cations are $(Na_{0.40}K_{0.05}Ca_{0.23}Mg_{0.23})$. A typical analysis of an Ash Meadows clay shows 57.1% $SiO_2$, 23.3% $Al_2O_3$, 4.0 MgO, and 2.0% $Fe_2O_3$.

Example V

Pyrophyllite was acid treated in a manner similar to that described in Example I except that the initial acid treating step was omitted since the material had substantially no base-exchangeable metal cations. The resulting slurry was further treated according to Example III. When the catalyst so produced is used in the processes described, the material is catalytically active and stable over a long period of time. It is more stable than the acid treated clay before reprecipitation of the alumina.

Example VI

Talc is treated with dilute sulfuric acid as described in Example I to remove impurities. It is then mixed with a strong solution of sulfuric acid (about 40% concentration) equivalent to two thirds of the magnesium present in the lattice. This mixture is heated at about 250° C. under pressure. The material thus produced is treated as in Example IV to produce an active, stable catalyst when used in various runs for catalytic conversion of hydrocarbons.

Example VII

Mid-Continent gas oil has been cracked catalytically with catalysts above described. A space velocity of about one volume of liquid oil charged per volume of catalyst is suitable. The space velocity in this process can be varied from about 0.5 to about 8 and is preferably in the range of about 0.5 to 4. A fixed bed of catalyst through which the gas oil is passed at a temperature of about 500° C. was used. Temperatures of 350–700° C. can be used. Pressures are preferably atmospheric and are normally below 50 pounds per square inch. The activity of the above catalysts is compared with Super Filtrol, an acid treated montmorillonite which is commercially used as a cracking catalyst. Super Filtrol is arbitrarily assigned the activity value of 100. On this basis the foregoing catalysts have an activity of about 120 to 150.

The catalysts are stable upon repeated reactivations to remove carbonaceous deposits by burning with air. After continued use, the decrease in activity of the catalysts of this invention is substantially less than the decrease found with Super Filtrol under similar conditions. Moreover, in treating gas oil charging stocks containing sulfur it is found that the catalysts of this invention are substantially more stable than the Super Filtrol catalyst.

Example VIII

The foregoing catalysts may be used for the treatment of gasoline containing olefins to produce motor fuels essentially aromatic and paraffinic in nature and having a markedly improved susceptibility to octane improvement obtained by the addition of tetraethyl lead. Operating conditions are usually about 350 to 500° C. The pressure may vary from about atmospheric or thereabouts to approximately 500 pounds per square inch or higher. It is preferably of the order of about 50 to 200 pounds per square inch. The liquid space velocities of about 0.5–5 are preferred.

When treating a gasoline produced by catalytic cracking having a olefin content of about 72%, and a bromine number of about 104, with the catalysts of this invention, the resulting gasoline product contains substantially no olefins which are apparently largely converted to aromatic and paraffinic hydrocarbons. The catalyst can be regenerated by heating in the presence of oxygen containing gas under controlled conditions, so that the temperature does not exceed about 700° C. This gasoline has a greater susceptibility to tetraethyl lead than the original gasoline and is suitable as a component for high octane aviation gasoline.

Example IX

Normally gaseous olefin hydrocarbons such as the butenes may be treated with the catalysts described in the examples to convert them into liquid polymers. A temperature of 350° C. at 500 pounds per square inch pressure is used. The catalyst is more active for polymerization than is the activated clay type of catalyst.

Example X

A gasoline produced by the thermal, non-catalytic cracking of a crude oil having an octane rating of about 65 may be reformed in contact with the foregoing catalysts at 475° C. with a liquid space velocity of 5 to increase the octane rating to 68–70. The temperature which may be employed is in the range of about 350–500° C. and space velocities of about 4–25 may be used. A yield of more than 96% of gasoline is recovered. It is found that the susceptibility to octane improvement by adding tetraethyl lead is materially improved. The catalyst is more active than the corresponding Super Filtrol.

I claim as my invention:

1. A process for producing catalysts from a siliceous mineral having a planar lattice structure which comprises extracting approximately 10 to about 90% of the intraplanar metal atoms using a mineral acid, adding a reducing compound to the mixture capable of maintaining iron in solution in the presence of a volatile alkaline precipitant, and precipitating as a hydrated oxide on the mineral thus treated at least a part of said extracted intraplanar metal, selected from the group consisting of aluminum and magnesium, by means of a volatile alkali.

2. A process for making a catalyst which comprises extracting about 10–90% of the intraplanar metal atoms from a siliceous mineral having a planar lattice structure by treating said mineral with a mineral acid at a temperature of about 80–250° C. and adding a reducing agent thereto, reducing reducible metal ions to a lower valence state, and then precipitating as a hydrated oxide on the mineral thus treated, at least a part of said extracted lattice metal, selected from the group consisting of aluminum and magnesium, by means of a volatile alkali, under conditions such that said reduced metal ions are not precipitated and then calcining the mixture thus produced.

3. A process for producing catalysts from a siliceous mineral having a planar lattice structure which comprises heating said mineral with a mineral acid of about 5 to 15% concentration at a temperature of from about 80° C. to the boiling point to remove base exchangeable metal cations, separating and discarding the resulting solution, washing the solid material with water, then heating the washed material with an aqueous solution of a mineral acid of about 5 to about 40% concentration at a temperature above 80° C. to remove about 10 to about 90% of the intraplanar metal atoms, adding a reducing agent to the mixture in sufficient quantity to reduce ferric iron in the solution to the ferrous state, thereafter adding a volatile alkali in a quantity sufficient to precipitate at least a part of an intraplanar metal selected from the group consisting of aluminum and magnesium and mixtures thereof but without precipitating iron, separating the supernatent liquid and washing the residue with water, drying the residue and calcining it.

GLENROY STECKER.

REFERENCES CITED

The following references are of record in the file of this patent:

UNITED STATES PATENTS

| Number | Name | Date |
| --- | --- | --- |
| 971,149 | Schick | Sept. 27, 1910 |
| 1,953,144 | Wilson | Apr. 3, 1934 |
| 2,212,034 | Morrell et al. | Aug. 20, 1940 |
| 2,253,486 | Belchetz | Aug. 19, 1941 |
| 2,320,799 | Ruthruff | June 1, 1943 |
| 2,371,619 | Hartley | Mar. 20, 1945 |
| 2,395,198 | Schulze | Feb. 19, 1946 |
| 2,408,207 | Garrison et al. | Sept. 24, 1946 |
| 2,410,436 | Ewing | Nov. 5, 1946 |
| 2,431,206 | Spicer et al. | Nov. 18, 1947 |
| 2,467,271 | Peer | Apr. 12, 1949 |
| 2,489,309 | Mills et al. | Nov. 29, 1949 |

OTHER REFERENCES

Lowry, "Inorg. Chem.," 2nd ed., 1931, pgs. 944–5. (Copy in Div. 64.)

Babor & Lehram, "Gen. College Chem.," 1940, pg. 556. (Copy in Div. 64.)